United States Patent Office 2,807,979
Patented Oct. 1, 1957

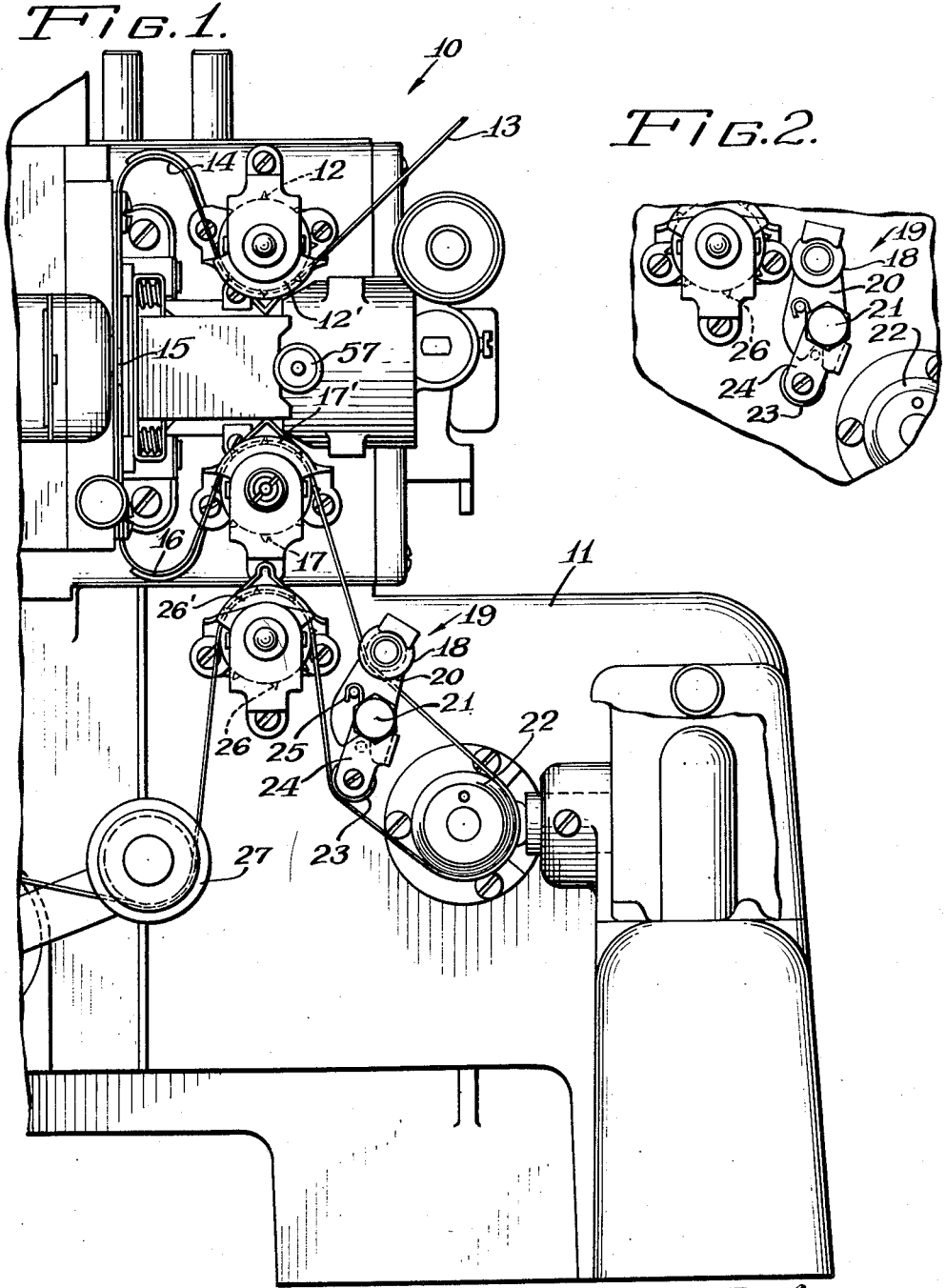

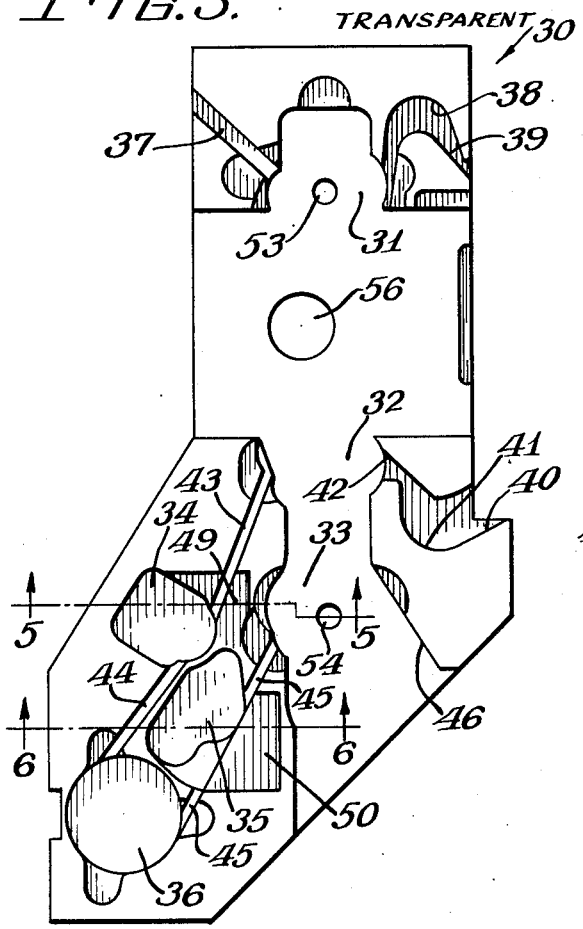

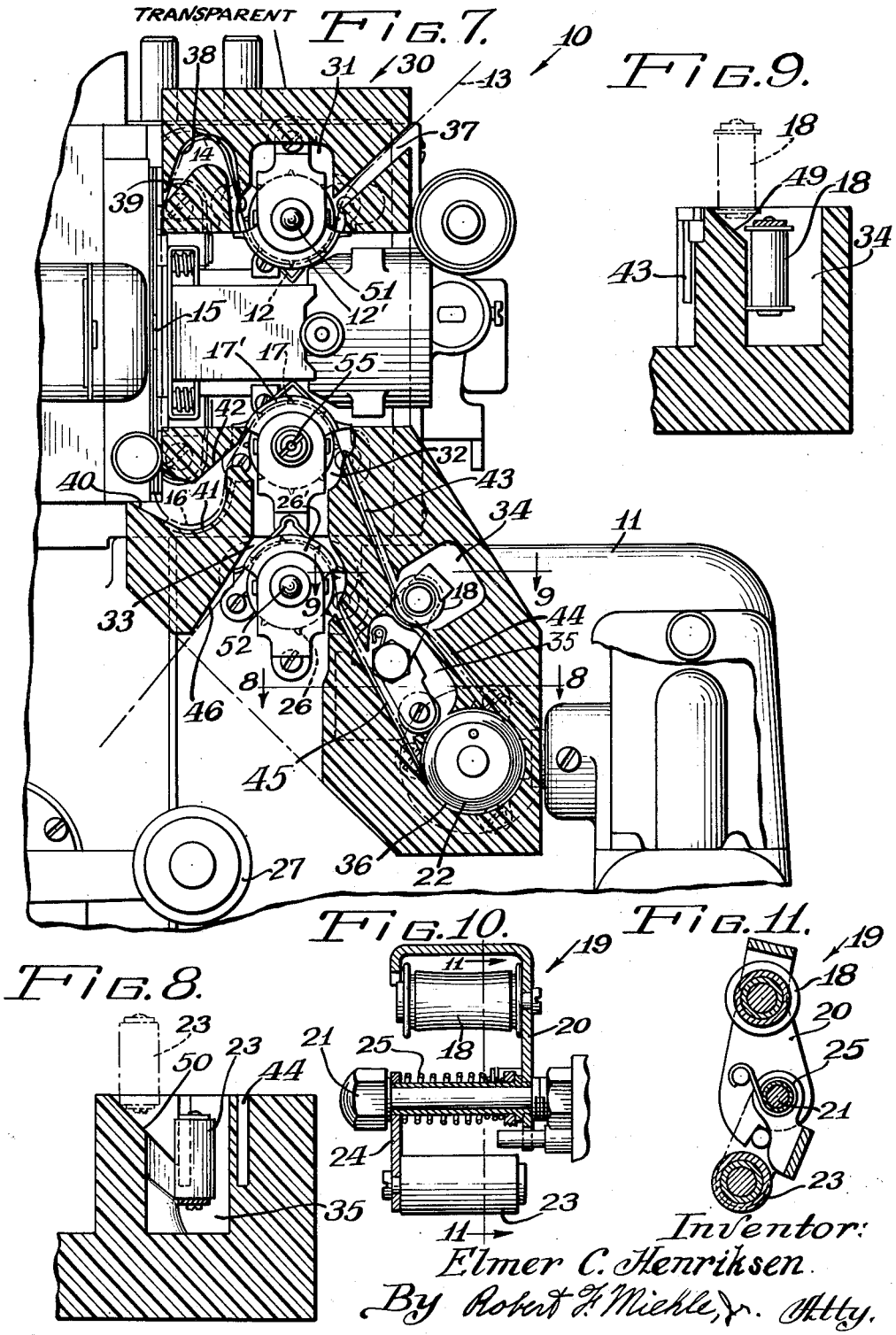

2,807,979

DEVICE FOR SELF THREADING MOTION PICTURE DEVICES

Elmer C. Henriksen, Chicago, Ill., assignor to Bell & Howell Company, Chicago, Ill., a corporation of Illinois Application December 22, 1955, Serial No. 554,780

12 Claims. (Cl. 88—18)

This invention relates, generally, to motion picture devices and it has particular relation to self threading devices therefor. It can be employed in conjunction with the motion picture projector shown in Patent No. 2,573,267, issued October 30, 1951, but its use is not limited to a projector of that particular type.

Among the objects of this invention are: To provide for self threading a motion picture device, such as a projector, in a new and improved manner; to employ a bodily applicable and removable unitary film threading or lacing device; to provide for self threading a motion picture device without requiring the adjustment of any part thereof; to apply the self threader to existing projectors; to remove the self threader once the film has been properly laced in the projector; and to construct the self threader in such manner and form as not to interfere with the operation of the projector if it is not removed.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 is a view, in side elevation, and at full scale of a portion of a motion picture projector with which the present invention can be employed;

Figure 2 is a view, in side elevation, of the oscillating stabilizer in the inoperative position together with portions of the auxiliary take-up sprocket and of the sound drum;

Figure 3 is a view, in side elevation, of the self threader block the view being taken from the side of the block that is applied to the projector;

Figure 4 is a view, in end elevation, of the block as shown in Figure 3;

Figure 5 is a horizontal sectional view taken generally along the line 5—5 of Figure 3;

Figure 6 is a horizontal sectional view taken generally along the line 6—6 of Figure 3;

Figure 7 is a vertical sectional view through the self threader block as applied to the projector and showing how the film is threaded thereby;

Figure 8 is a horizontal sectional view taken generally along the line 8—8 of Figure 7;

Figure 9 is a horizontal sectional view taken generally along the line 9—9 of Figure 7;

Figure 10 is a vertical sectional view through the oscillating stabilizer; and

Figure 11 is a vertical sectional view taken generally along the line 11—11 of Figure 10.

Referring now to the drawings and particularly Figure 1 thereof it will be observed that the reference character 10 designates, generally, a portion of a sound motion picture device that is employed as a projector. It includes a frame 11 that carries a film supply sprocket 12 having an arcuate film guide 12' underneath that is releasable for receiving a film 13 when the same is manually threaded. From the film supply sprocket 12 the film 13 forms an upper loop 14 and then passes downwardly through intermittent film feed means 15 of known construction to a lower loop 16. Thence the film 13 is carried over a film take-up sprocket 17 underneath an arcuate releasable film guide 17' that can be swung away for manual threading as will be understood.

As indicated the motion picture device 10 is a sound projector. Accordingly the film 13 extends from the film take-up sprocket 17 underneath an upper roller 18 of an oscillating stabilizer that is shown generally at 19 and may be constructed as shown in more detail in the patent above referred to. The roller 18 is carried by an upper arm 20 that is rockable about the longitudinal axis of a stud 21 which extends laterally from the frame 11. The film 13 passes over a sound drum 22 the construction of which is well known and then back underneath a lower roller 23 that is carried by a lower arm 24 of the oscillating stabilizer 19. As shown more clearly in Figures 10 and 11 of the drawings, the lower arm 24 is rockable about the axis of the stud 21 and a spring 25 reacts between the upper and lower arms 20 and 24 to bias them to the inoperative position shown in Figure 2. It will be understood that, when the film 13 is threaded, as shown in Figure 1, the upper and lower arms 20 and 24 are swung to the operative positions shown in Figure 1 against the tension of the spring 25 in order to apply predetermined tension to the film 13 and render its passage over the sound drum 22 at a uniform speed.

The film passes from underneath the lower roller 23 over an auxiliary take-up sprocket 26 that is located directly underneath the film take-up sprocket 17. An arcuate film guide 26' is releasably mounted above the auxiliary take-up sprocket 26 to facilitate manual threading. The film then extends over a guide 27 and then is wound on a take-up reel as will be understood.

The usual threading of the projector 10 is accomplished by manually placing the film 13 underneath the film supply sprocket 12 after the film guide 12' has been opened sufficiently to permit application of the film. Then it is formed into the upper loop 14 and the intermittent film feed means 15 is opened to receive the film. Then the lower loop 16 is formed and the film guide 17' is opened to permit application to the film take-up sprocket 17. The film 13 is positioned under the upper roller 18 and over the drum 22. Then it is positioned under the lower roller 23 and the film guide 26' is opened to permit application to the auxiliary take-up sprocket 26. In accordance with the present invention all of these operations are performed automatically and the film 13 is threaded merely by inserting the leading end and starting the motor (not shown) which operates the projector 10.

For this purpose a self threader block 30, Figures 3 and 4, is employed. The block 30 is formed preferably of transparent plastic, such as methyl methacrylate resin, and is a one piece molding having various cavities and passageways molded therein as will be described presently. The block 30 is transparent in order to permit the threading operation to be viewed if desired. It is applicable and removable as a unit to and from the projector 10.

In describing the block 30 particular reference will be had to Figures 3, 4 and 7 of the drawings. As there shown a space 31 is provided for containing and overlying the film supply sprocket 12. It is located in the upper end of the block 30. Directly below the space 31 is a space 32 for containing and overlying the film take-up sprocket 17. Directly below the space 32 is a space 33 for containing and overlying the auxiliary take-up sprocket 26. Spaces 34 and 35 are provided to one side and below the space 33 for receiving the arms 20 and 24 carrying the upper roller 18 and lower roller 23. These spaces are of sufficient size to permit movement of these arms and the rollers carried thereby as is necessary. Below and to one side of the spaces 34 and 35 is a space 36 for containing and overlying the sound drum 22. It will be understood that, when the self threader block 30 is positioned, as shown in Figure 7, on the projector 10, the various spaces 31—36 overlie and contain the respective parts of the projector 10 in spaced relation so as not to interfere in any manner with their intended operation.

The film from a suitable supply reel (not shown) is fed manually through an entrance slot 37 that is located near the upper end of the block 30 and extends downwardly in order to direct the film 13 underneath the film supply sprocket 12. The film is guided around the film supply sprocket 12 which, it will be understood, is rotating as are the sprockets 17 and 26. Also the intermittent film feed means 15 is operating.

The film is fed upwardly from underneath the film supply sprocket 12 and the leading end engages a downwardly concave surface 38 which forms the upper loop 14. The leading end of the film 13 then is deflected outwardly by an upwardly facing downwardly inclined film guiding surface 39 which underlies the trailing end of the concave surface 38. This surface 39 directs the leading end of the film laterally and into the intermittent film feed means 15 which is operating as pointed out above. It is unnecessary to open the intermittent film feed means in order to receive the film when the self threader block 30 is employed.

As the leading end of the film 13 comes out of the lower end of the intermittent film feed means 15, it impinges upon a leading end 40 of an upwardly concave surface 41 that is formed on the block 30 and thus the lower loop 16 is formed. The leading end of the film is guided by the concave surface 41 upwardly to engage a downwardly facing upwardly inclined film guiding surface 42 which directs it over the top of the film take-up sprocket 17 which is rotating. From the sprocket 17 the film is carried downwardly through an exit slot 43. In the event that the sound portion of the projector 10 is not provided, the portion of the film threader block 30 thus far described can be employed for automatically threading a film on such a projector. In such case the film from the exit slot 43 would be directed to a suitable take-up reel as will be understood readily.

When the projector 10 is provided with sound equipment, as described, the leading end of the film 13 is guided through the exit slot 43 and underneath the upper roller 18 to an upper drum slot 44 that extends downwardly generally tangentially to the periphery of the sound drum 22. The film 13 is guided around the drum 22 since its leading end engages the circular periphery of the space 36 around the drum and thus it is directed away therefrom upwardly through a lower drum slot 45 underneath the lower roller 23. The lower drum slot 45 directs the leading end of the film 13 to the upper side of the auxiliary take-up sprocket 26 which is rotating and it carries this leading end over the top and downwardly to engage a downwardly inclined surface 46 whence the leading end of the film 13 is directed downwardly for manual threading over the guide 27 and to the take-up reel (not shown).

It will be recalled that the upper arm 20 and the lower arm 24 of the oscillating stabilizer 19 occupy the inoperative position shown in Figure 2 when the film 13 is not threaded thereover. It is necessary to swing these arms against the biasing action of the spring 25 in order to place them in the operative position shown in Figure 1 for performing the self threading operation. This is accomplished automatically when the self threader block 30 is applied to the projector 10. For this purpose an inclined surface 49, Figure 9, is provided on the self threader block 30. It engages the upper roller 18 as the self threader block 30 is moved laterally and causes it to ride over it until it reaches a position in alignment with the space 34. Thereupon continued movement of the self threader block 30 to the threading position effects relative movement of the upper roller 18 into the position shown by full lines in Figure 9.

Similarly an inclined surface 50 is provided on the self threader block 30 for engaging the lower roller 23 as shown in Figure 8. The initial position of the lower roller 23 is shown by broken lines. As the self threader block 30 is moved to operative position on the projector 10, the lower roller 23 slides over the inclined surface 50 until it is in alignment with the space 35. Thereupon, continued lateral movement of the self threader block 30 effects relative movement of the lower roller 23 to the position shown by full lines in Figure 8 where it is in position to receive the leading end of the film 13 from the space 36 where the sound drum 22 is located.

Provision is made for guiding the self threader block 30 into operative position on the projector 10 and for holding it in this position while the self threading operation is performed. For this purpose centering pins 51 and 52 can be provided on the projector 10 coaxially with the film supply sprocket 12 and the auxiliary take-up sprocket 26. The pins 51 and 52, which project laterally from the projector 10, are arranged to interfit with apertures 53 and 54 in the self threader block 30. It will be observed in Figure 3 that these apertures are concentric with the axes of the spaces 31 and 33 for the film supply sprocket 12 and the auxiliary take-up sprocket 26 respectively.

It will be observed that an oil hole 55 is provided for the film take-up sprocket 17 and it will be understood that the centering pins 51 and 52 have been located in similar oil holes for the sprockets 12 and 26. It will be understood that the mounting means for the self threader block 30 on the projector 10 can be reversed. That is, pins equivalent to the centering pins 51 and 52 can project from the self threader block 30 at the locations of the apertures 53 and 54 for entering into openings, such as oil holes for the sprockets 12 and 26. Moreover, other suitable mounting means can be provided for insuring that the self threader block 30 will be moved into proper position for accomplishing the self threading of the film 13. Whatever mounting means are used are designed to facilitate bodily application and removal of the self threader block 30 to and from the projector 10.

The self threader block 30 is provided with a clearance hole 56 to receive a head of a set screw 57 that is employed for holding the projection lens (not shown) in position.

In describing the operation of the self threader block 30, it will be assumed that the film 13 is to be threaded so that it will occupy the position as shown in Figure 1 of the drawings. The self threader block 30 is applied by registering the apertures 53 and 54 with the pins 51 and 52 and moving it laterally until it occupies the position shown in Figure 7 of the drawings. In this position it will be understood that the spaces 31—36 overlie and contain the respective elements previously described and that the intermittent film feed means 15 is overlaid by the block 30 in an extent sufficient to direct the film into the top and out at the bottom.

The leading end of the film 13 then is fed into the entrance slot 37 after the motor of the projector 10 has been started. It follows the action previously described underneath the film supply sprocket 12, forms the upper loop 38, passes downwardly through the intermittent film feed means 15, forms the lower loop 16, passes upwardly over the film take-up sprocket 17, moves downwardly through the exit slot 43 underneath the upper roller 18, through the upper drum slot 44 to the space or cavity 36, around the sound drum 22, upwardly through the lower drum slot 45 underneath the lower roller 23, over the auxiliary take-up sprocket 26 and downwardly past the surface 46. The leading end then can be grasped by the operator and threaded over the guide 27 and onto the take-up reel. If desired, the self threader block 30 can be left in position since it in nowise interferes with the operation of the film 13 as it is fed through the projector 10 for normal operation. On the other hand, the self threader block 30 can be removed, if desired.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A self threader for a motion picture device having film supply and take-up sprockets respectively above and below and to one side of intermittent film feed means with respect to which film is fed with loops above and below said intermittent film feed means and between the same and said sprockets, said self threader comprising a block having hollowed out portions to overlie and contain in spaced relation thereto said sprockets and to overlie said intermittent film feed means and having an entrance slot for directing the film to the under side of said film supply sprocket and a downwardly concave surface between said film supply sprocket and the upper end of said intermittent film feed means to direct the film from said film supply sprocket to said intermittent film feed means and form the upper loop, said block having an upwardly concave surface between the lower end of said intermittent film feed means and said film take-up sprocket to direct the film from said intermittent film feed means to said film take up sprocket and form the lower loop, and said block having an exit slot to direct the film away from the upper side of said film take-up sprocket.

2. The invention as set forth in claim 1 wherein the block has an upwardly facing downwardly inclined film guiding surface underlying the trailing portion of the downwardly concave surface for directing the film laterally to the upper end of the intermittent film feed means, the leading end of the upwardly concave surface underlies the lower end of said intermittent film feed means, and the block has a downwardly facing upwardly inclined film guiding surface overlying the trailing portion of said upwardly concave surface for directing the film laterally to the take-up sprocket.

3. The invention as set forth in claim 2 wherein the entrance slot is inclined downwardly toward the supply sprocket and the exit slot is inclined downwardly away from the take-up sprocket.

4. The invention as set forth in claim 1 wherein cooperating means are provided on the motion picture device and on the block for guiding the latter into operative position on the former.

5. The invention as set forth in claim 4 wherein the cooperating means comprises telescoping pins and slots.

6. The invention as set forth in claim 1 wherein the block is formed of one piece transparent material and the film can be seen therethrough.

7. A self threader for a motion picture device having film supply and take-up sprockets respectively above and below and to one side of intermittent film feed means with respect to which film is fed with loops above and below said intermittent film feed means and between the same and said sprockets, an auxiliary film take-up sprocket below said take-up sprocket, a sound drum below and to one side of said auxiliary film take-up sprocket over which the film is fed from said take-up sprocket to said auxiliary take-up sprocket, and an oscillating stabilizer between said take-up sprockets and said sound drum comprising a pair of arms rockable about a common axis and extending generally upwardly and downwardly and carrying upper and lower rollers engaging the film in operative position under tension of a spring acting to bias the arms to inoperative position, said self threader comprising a block having hollowed out portions to overlie and contain in spaced relation thereto said sprockets, oscillating stabilizer and drum and to overlie said intermittent film feed means, said block having an entrance slot for directing the film to the underside of said film supply sprocket, a downwardly concave surface between said film supply sprocket and the upper end of said intermittent film feed means to direct the film from said film supply sprocket to said intermittent film feed means and form an upper loop, an upwardly concave surface between the lower end of said intermittent film feed means and said film take-up sprocket to direct the film from said intermittent film feed means to said film take up sprocket and form the lower loop, an exit slot to direct the film away from the upper side of said film take-up sprocket underneath said upper roller, upper and lower drum slots connected by an upwardly concave surface to direct the film from said upper roller, around said drum, underneath said lower roller to the upper side of said auxiliary take-up sprocket, and a downwardly inclined surface to direct the film from the upper side of said auxiliary take-up sprocket out of said block.

8. The invention as set forth in claim 7 wherein the block has an upwardly facing downwardly inclined film guiding surface underlying the trailing portion of the downwardly concave surface for directing the film laterally to the upper end of the intermittent film feed means, the leading end of the first mentioned upwardly concave surface underlies the lower end of said intermittent film feed means, and the block has a downwardly facing upwardly inclined film guiding surface overlying the trailing portion of said first mentioned upwardly concave surface for directing the film laterally to the take-up sprocket.

9. The invention as set forth in claim 7 wherein the block is provided with inclined surfaces engageable by the upper and lower rollers in the inoperative position of the arms of the oscillating stabilizer to swing them to operative position against the biasing action of the spring as the block is moved into overlying posiiton with respect to the aforesaid elements of the motion picture device.

10. The invention as set forth in claim 7 wherein cooperating means are provided along the axes of the film supply and auxiliary take-up sprockets and on the block for guiding the latter into operative position with respect to the former.

11. A self threader for a motion picture device having parallel film supply and take-up sprockets respectively above and below and to one side of intermittent film feed means with respect to which film is fed with loops above and below said intermittent film feed means and between the same and said sprockets, said self threader comprising a one piece block having hollowed portions and movable longitudinally of the sprocket axes into and out of overlying spaced relation to enclose said sprockets in spaced relation and to overlie said intermittent film feed means and having guideways formed therein for directing the film over said supply sprocket, along the upper loop, into and out of said intermittent film feed means, along the lower loop, and to and from said take-up sprocket.

12. A self threader for a motion picture device having film supply and take-up sprockets respectively above and below and to one side of intermittent film feed means with respect to which film is fed with loops above and below said intermittent film feed means and between the same and said sprockets, an auxiliary film take-up sprocket below said take-up sprocket, a sound drum below and to one side of said auxiliary film take-up sprocket over which the film is fed from said take-up sprocket to said auxiliary take-up sprocket, and an oscillating stabilizer between said take-up sprockets and said sound drum comprising a pair of arms rockable about a common axis and extending generally upwardly and downwardly and carrying upper and lower rollers engaging the film in operative position under tension of a spring acting to bias the arms to inoperative position, said self threader comprising a one piece block having hollowed out portions and movable laterally into and out of overlying relation to contain in spaced relation said sprockets, oscillating stabilizer, and drum and to overlie said intermittent film feed means and having guideways formed therein for directing the film over said supply sprocket, along the upper loop, into and out of said intermittent film feed means, along the lower loop, over said take-up sprocket, under said upper roller, around said drum, under said lower roller, and over said auxiliary take-up roller.

References Cited in the file of this patent

UNITED STATES PATENTS 2,472,143   Briskin ---------------- June 7, 1949